Sept. 9, 1958 T. CARROLL 2,851,144
CONVEYOR FOR HARVESTERS
Filed June 1, 1954 3 Sheets-Sheet 1

Inventor:
Thomas Carroll
by James E. Nilles
Attorney

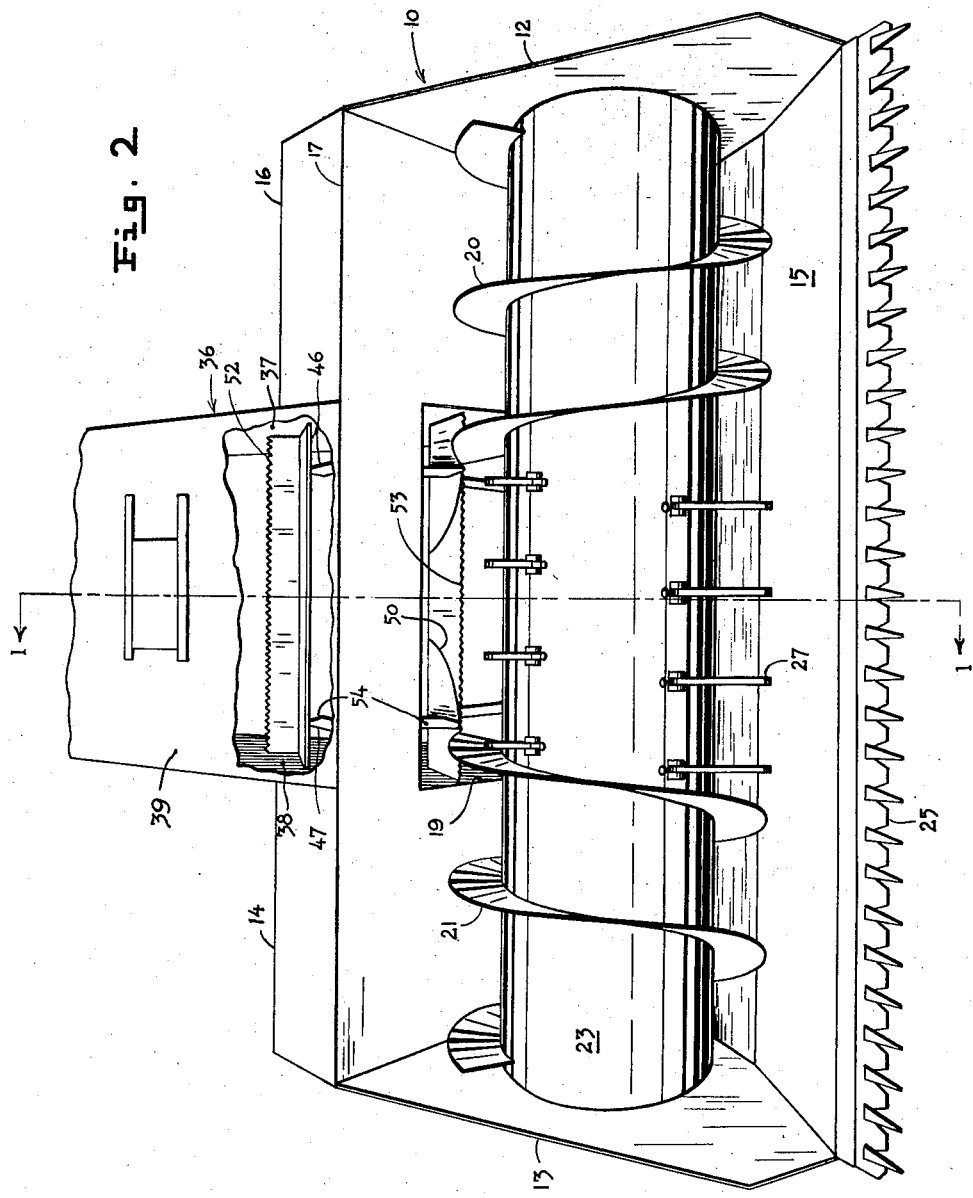

Sept. 9, 1958 T. CARROLL 2,851,144
CONVEYOR FOR HARVESTERS
Filed June 1, 1954 3 Sheets-Sheet 3

Inventor:
Thomas Carroll
by James E. Nilles
Attorney

United States Patent Office 2,851,144
Patented Sept. 9, 1958

2,851,144

CONVEYOR FOR HARVESTERS

Thomas Carroll, Toronto, Ontario, Canada, assignor to Massey-Harris-Ferguson Limited, Toronto, Ontario, Canada, a limited corporation of Canada Application June 1, 1954, Serial No. 433,781

2 Claims. (Cl. 198—9)

This invention relates to harvester-threshers, more commonly referred to as combines. It is more particularly concerned with the conveyor, sometimes referred to as the vertical elevator which conveys the crop material from the harvesting table rearwardly to the threshing portion of the machine.

This invention is an improvement over prior art structures such as are disclosed in my co-pending application, Serial No. 157,546, filed April 22, 1950 now Patent No. 2,696,290 issued December 7, 1954.

An object of this invention is to provide a conveyor for a combine which will deliver crop material from the harvester portion to the thresher portion in a very effective and efficient manner, without plugging or winding of material, and requiring less horsepower to perform its functions than prior art structures with which I am familiar.

It is an object of this invention to provide a vertical elevator for delivering crop material rearwardly from a harvester table which is simple in construction and operation, easily maintained and highly efficient in performing the functions for which it was designed.

It is an object of this invention to provide a vertical elevator for conveying material rearwardly from a harvester table comprising rotary members which, together with the auger conveyor on the table, are so positioned and have such speeds relative to one another that they very efficiently perform the functions for which they were designed.

It is still another object of this invention to provide an improved elevator-conveyor for a harvesting table which results in a machine of low outline and short length. In this regard the conveying device is made as short and low as possible and considerably lighter in weight than conventional machines. This results in a harvester table that is very easily adjusted as to height. Furthermore, by providing a table that is closely coupled to the wheels, the undulations of the ground affecting the rear axle cause less vertical movement of the table.

Other objects and advantages of this invention will appear more fully as this disclosure progresses, reference being had to the accompanying drawings in which:

Figure 2 is a perspective view of the table and elevator taken from the front of the combine in a direction indicated by line 2—2 in Figure 1.

Figure 1:
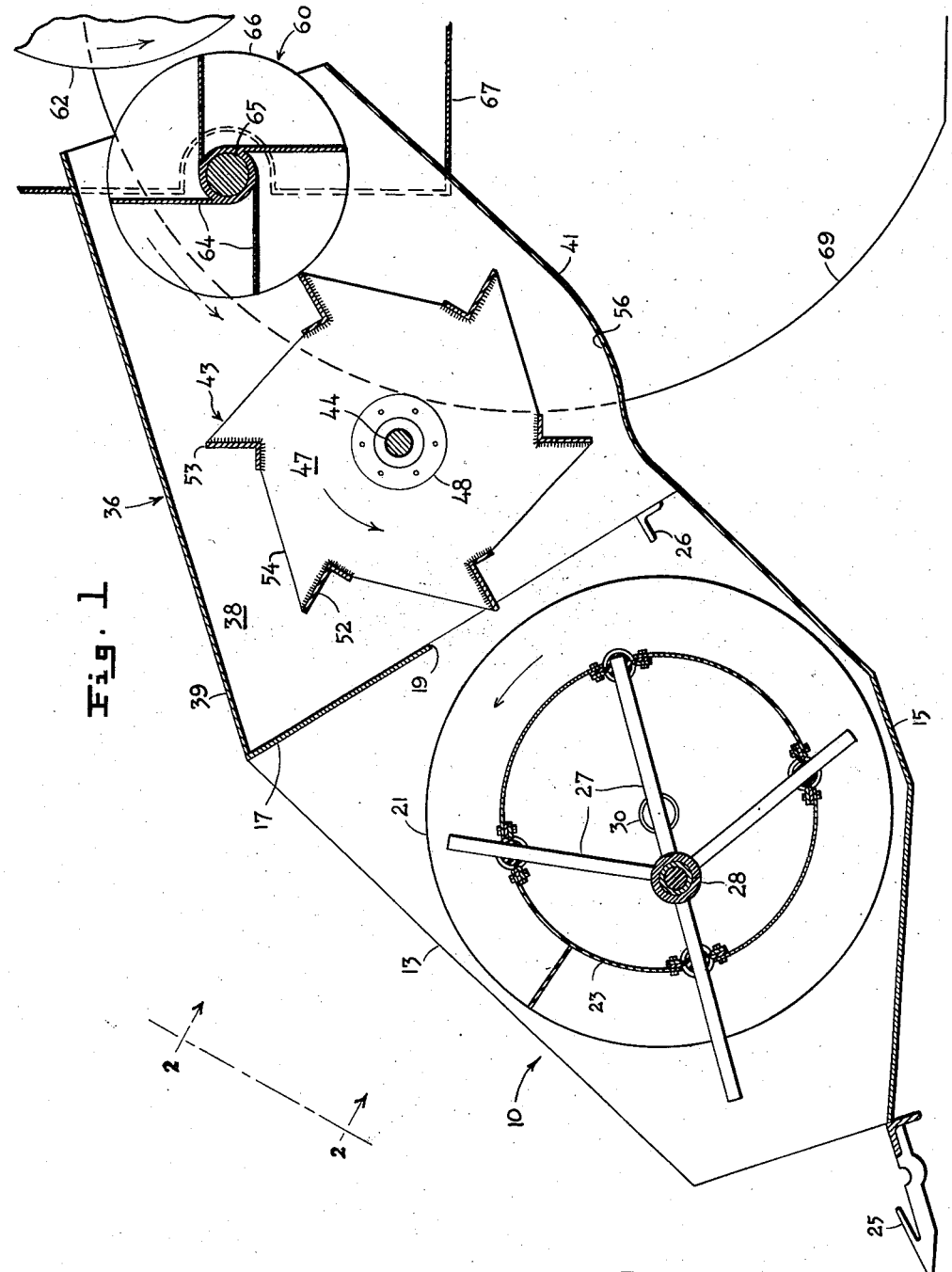
Figure 1 is a vertical, sectional view of the table and elevator taken on a centerline therethrough.

Referring more particularly to the drawings, a harvesting table 10 is comprised of end walls 12, 13, a bottom trough 15 and a rear wall 17. Reinforcing plates 14, 16 are secured to the upper edge of the rear wall 17 and at their inner ends to the elevator housing. At their outer ends, plates 14, 16 are rigidly secured to that portion of the side walls 12, 13 which extend rearwardly past the rear wall 17. This particular table and elevator construction results in an especially rigid structure and relatively light gauge sheet metal can be utilized in the fabrication thereof. Intermediate the length of the rear wall 17 is a crop outlet 19 through which passes the crop material as it is delivered to the center of the table 10 by the helical screws or auger flights 20, 21 of the auger tube 23. The material that is cut by the conventional sickle and guards 25 in front of the screws 20, 21 is, for the most part, delivered laterally from the sides of the table to the center thereof along the "cut off" bars 26, one of which is secured to rear wall 17 on either side of outlet 19. As this material reaches the center of the table behind the auger tube 23, it is joined by that material which has been severed by that part of the sickle 25 directly in front of the fingered portion of the auger tube. In effect, therefore, there are three crop streams which merge together behind the central portion of the tube and are then immediately, and in a continuous smooth flow, directed rearwardly by the conveyor to be described. The fingered portion of the auger tube is well known and comprises the retractable fingers 27 which are rotatably secured to an eccentric crank 28 rigidly mounted within tube 23. These fingers are rotated by rotation of the tube 23 and extend farthest at the forward side of tube 23 and force the crop material, which is cut directly in front of them, under the tube. As the fingers reach the rear side of the tube they are fully retracted within the tube so as to prevent "carry over" of material around the tube and so as to not impede the flow of crop material that is being delivered transversely toward the center of the table by the lateral conveyor screws 20, 21. The tube 23 is journaled on shafts 30 which are secured in end walls 12, 13. In some types of harvester tables, such as in "pull type" machines, the outlet 19 is at one end of the table and there would be only one helical flight delivering material from one side of the table.

An elevator housing 36 is secured to the rear wall 17 of the table 10 and extends rearwardly therefrom. Housing 36 comprises side walls 37, 38, a cover plate 39 and a bottom wall or chute 41. A cylindrical conveyor 43 is secured to a hub means such as a shaft 44 which is rotatably mounted in side walls 37, 38 within the housing. Rotary conveyor 43 is positioned in proximity to the fingered portion of the auger tube so as to receive crop material directly therefrom and, because of its relatively large diameter, serves to effectively strip the material from the tube 23 and grasp the merging crop streams, forcing them in a continuous and smooth flow under itself and up the chute 41.

The cylindrical conveyor 43 is fabricated from two disc-like members 46, 47 which are axially spaced on shaft 44 and secured thereto by hubs 48. Portions 50 are partially cut from the disc and bent at 90 degrees to the discs to form braces to which are secured, as by spot-welding, the transverse flight bars 52. Bars 52 are angle shaped, as shown in Figure 1 and have a serrated leading edge 53 which, during the rotation of the cylindrical conveyor 43, pass through the outlet 19 into the harvesting table 10 to effectively engage the crop material. Between the bars 52, the edges of the discs are bent inwardly 90 degrees to form reinforcing portions 54. The cylindrical conveyor 43 so formed is light in weight yet very rigid and strong. It is capable of being driven at substantial speeds without excessive power requirements and there is nothing to get out of alignment or require maintenance.

The chute 41 has a curved portion 56 which is formed substantially on a radius with shaft 44 as a center. This curved portion 56 cooperates with cylindrical conveyor 43 in that it gives the conveyor a longer effective gripping area on the material.

In prior art structures, above referred to, where an undershot elevator is comprised of a plurality of endless chains trained around front and rear sprockets, the material is dragged up the bottom chute by transverse bar members which force the material against the bottom chute and drag it therealong. In these prior art machines, the space between the chain conveyor and the chute is necessarily very small, on the order of a fraction of an inch in some cases. It can readily be appreciated that considerable horsepower is required to operate such a conveyor, especially when slugs of material are encountered. Furthermore, in these prior art machines, considerable "balling up" of material occurs within the upper and lower flights of the conveyor and it has been proposed to use anti-wind shields between the flights to prevent this troublesome condition. Maintenance problems are also of considerable concern in such structures. Instead of dragging the crop material up the chute, which is characteristic of prior art devices above referred to, the conveyor 43 has a throwing action of the material that it grasps on the curved chute portion 56. This conveyor also has a fan action due to the large bars 52 and their peripheral speed, which blows the light material, such as chaff, grain, etc., up the chute and contributes to an efficient conveying action.

The beater 60 is rotatably mounted within housing 36 and is positioned closely adjacent conveyor 43. Crop engaging blades 64, which have a serrated or saw-tooth leading edge, are secured tangentially with respect to driven shaft 65 on which they are mounted. Blades 64 are secured at either side to circular end plates 66. The blades 64 strip the crop from bars 52 of the conveyor and in turn are stripped clean by the threshing cylinder 62 as the crop is delivered to the underside of the cylinder. This conventional cylinder 62 is mounted in the main housing 67 carried by wheels 69 in the well known manner. The peripheral speed of the beater 60 is greater than the peripheral speed of conveyor 43 which results in a flow of material with no hesitation.

Figure 4:
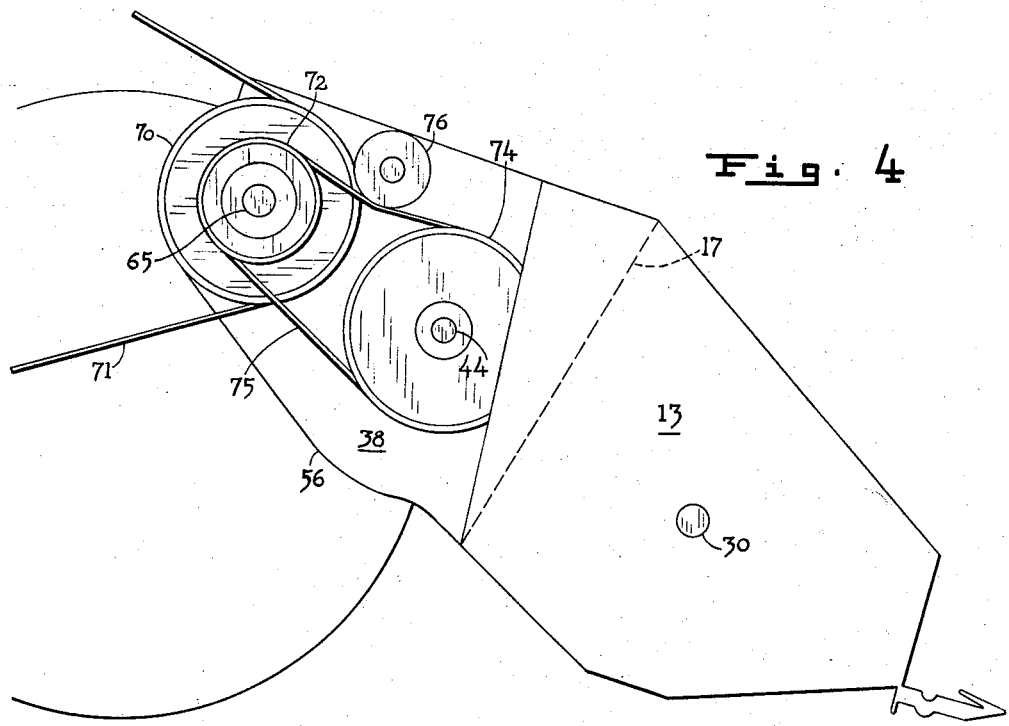
Figure 4 is an elevational view, on a reduced scale, of the right side of the table and elevator.
Figure 3:
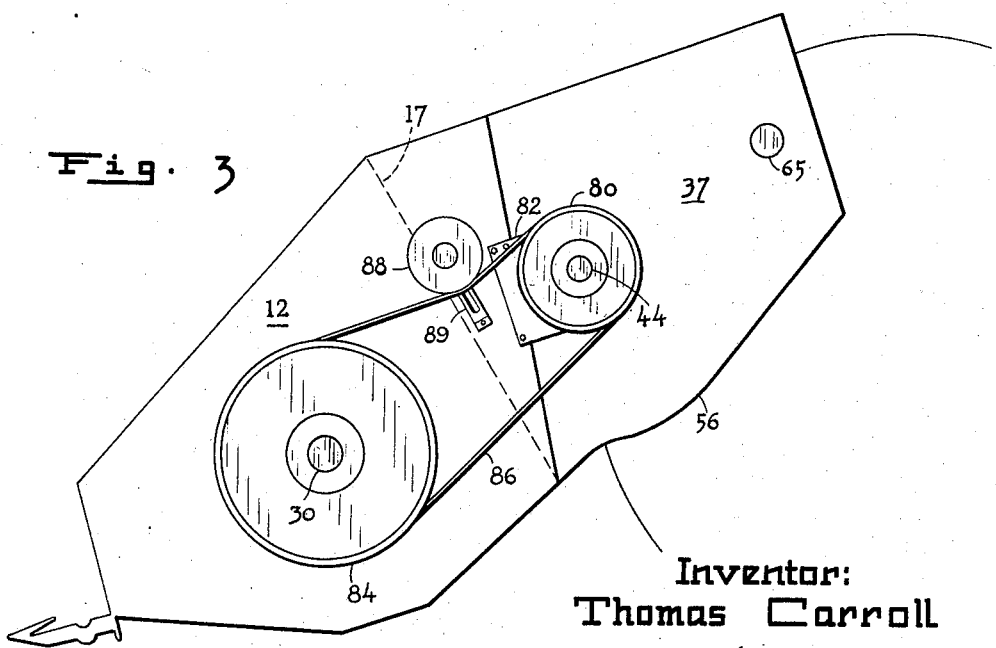
Figure 3 is an elevational view, on a reduced scale, of the left side of the table and elevator.

Figures 3 and 4 illustrate the driving means for the beater, conveyor and auger. The shaft 65 of the beater 60 has a first pulley 70 secured thereto at the right end as shown in Figure 4. A V-belt 71, which is driven from other power driven members on the machine, is trained over pulley 70 and furnishes the power for the harvester table. A second and smaller pulley 72 is also secured to shaft 65. A relatively larger pulley 74 is secured to the right end of conveyor shaft 44 and extends into the hollow area formed by the rear wall 17, end plate 13, elevator wall 38 and top plate 14. V-belt 75 is trained over pulleys 72 and 74 and held taut by the adjustable idler pulley 76 mounted on the side of housing 36. The conveyor 43 is thus rotated at a lower R. P. M. than is beater 60. In practice, it has been found very satisfactory to rotate the beater 60 at 660 R. P. M. and the conveyor at 330 R. P. M., while the auger is rotated at 195 R. P. M. by means about to be described. These speeds result in the conveyor having a peripheral speed greater than that of the auger flights but less than the peripheral speed of the beater blades 64. More specifically, peripheral speeds of approximately 1025 feet/min., 1425 feet/min. and 1750 feet/min. for the auger flights, conveyor and beater, respectively, have resulted in a smooth, continuous flow of crop material without any hesitation, plugging or winding.

As shown in Figure 3, a pulley 80 is secured to the left end of shaft 44. Shaft 44 extends from the side of housing 36 slightly beyond the side wall 12 of the auger table and is rotatably supported at this outer end by the bearing 81 mounted in bracket 82 which is secured to the side 12 of the auger table. Auger tube shaft 30 has a relatively larger pulley 84 secured on the left end at the outside of the table and V-belt 86 is held in driving engagement with pulleys 80, 84 by means of idler pulley 88 which is adjustably secured to the slotted bracket 89 on side wall 12. A simple and economical driving arrangement is thus provided for driving the various parts of this conveyor at relative speeds which result in an efficient conveying action.

Having thus shown and described this invention, what is desired to be secured by Letters Patent is:

1. In a harvester, a table having an outlet, an auger tube journalled in said table, said auger tube having spaced auger flights at each end thereof laterally offset relative to the outlet and finger elements which are extensible and retractable during the rotation of the auger tube positioned intermediate the auger flights in substantial alignment with said outlet, an elevator housing in communication with said table through said outlet and extending rearwardly therefrom, a cylindrical conveyor comprising a hub means rotatably mounted in said elevator housing, spaced disk-like members carried by said hub means, crop engaging bars secured to said disc-like members, said bars being transversely positioned and radially disposed with the radial outer edges thereof passing through the outlet into the table during the rotation of said cylindrical conveyor in order to strip crop material from the auger tube, said elevator housing including a bottom chute having the portion thereof below the cylindrical conveyor positioned closely adjacent thereto and cooperating therewith to move crop material therethrough, and means for rotating the auger tube and cylindrical conveyor.

2. In a harvester, a table having an outlet, an auger-type lateral conveyor journalled in said table, said lateral conveyor having spaced auger flights at each end thereof laterally offset relative to the outlet and finger elements which are extensible and retractable during the rotation of the lateral conveyor positioned intermediate the auger flights in substantial alignment with said outlet, an elevator housing in communication with said table through said outlet and extending rearwardly therefrom, a cylindrical conveyor comprising a hub means rotatably mounted in said elevator housing, laterally spaced disk-like members carried by said hub means, a plurality of circumferentially spaced crop engaging bars secured to said disk-like members, said bars being laterally extending and radially disposed with the radial outer edges thereof passing through the outlet into the table during the rotation of said cylindrical conveyor in order to strip crop material from the lateral conveyor, said elevator housing including a bottom chute having the portion thereof below the cylindrical conveyor positioned closely adjacent thereto and cooperating therewith to move crop material therethrough, a threshing cylinder in communication with said elevator housing for receiving crop material therefrom, a beater rotatably mounted intermediate the threshing cylinder and the cylindrical conveyor for stripping crop material from the cylindrical conveyor for delivering into the threshing cylinder, and means for rotating the lateral conveyor, cylindrical conveyor and beater with the cylindrical conveyor being rotated at a greater peripheral speed than the lateral conveyor and at a lower peripheral speed than the beater.

References Cited in the file of this patent

UNITED STATES PATENTS

| 2,112,922 | Millard | Apr. 5, 1938 |
| 2,644,284 | Overholtz et al. | July 7, 1953 |

FOREIGN PATENTS

| 17,488 | Australia | Dec. 20, 1929 |